Sept. 24, 1963 R. V. HEINZE 3,104,630
BURNER-REACTOR
Original Filed Dec. 31, 1956

*INVENTOR:*
ROBERT V. HEINZE
BY Marshall, Johnston, Cook
and Root

ATT'YS

United States Patent Office 3,104,630
Patented Sept. 24, 1963

3,104,630
BURNER-REACTOR
Robert V. Heinze, Hammond, Ind., assignor to Submerged Combustion, Inc., Hammond, Ind., a corporation of Indiana
Original application Dec. 31, 1956, Ser. No. 631,870, now Patent No. 2,991,987, dated July 11, 1961. Divided and this application Jan. 18, 1961, Ser. No. 83,864
2 Claims. (Cl. 110—45)

This invention, in general, relates to processes and apparatus for burning combustible materials or reacting chemicals. This application is a divisional application of my copending application Serial No. 631,870, filed December 31, 1956, now Patent No. 2,991,987.

The apparatus of this invention is concerned with a reactor for a burner and associated apparatus for the reaction of or burning of combustible solids or liquid slurries of combustible solids and the like. The reactor or burner comprises a reaction or combustion chamber with a gas exit and an unburned solids and/or liquid exit. It has a reaction or combustion zone or pot to which is fed solid fuel, slurries of solid fuel or other similar reactant chemical feed stocks by a rotating screw. The end of the screw adjacent the combustion zone has perforated arms extending outwardly. These arms are connected to a gas supply conduit whereby a combustion-supporting or reactable gas can be fed to the reaction or combustion zone. Additional gas can be supplied to the reaction or combustion zone through annular conduits opening into the zone about the opening through which the solid fuel or slurries thereof are fed to the reaction or combustion zone.

An embodiment of the invention is illustrated in the drawing wherein.

Figure 1:
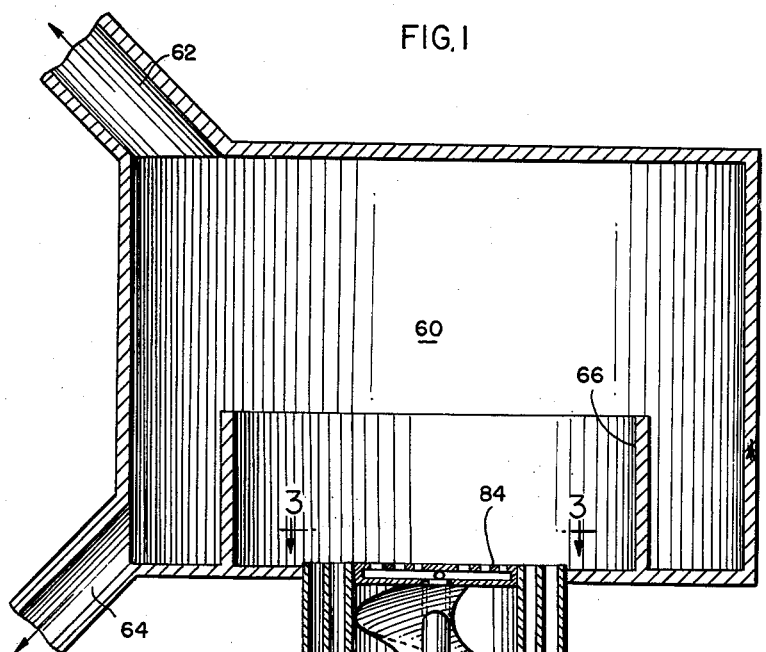
FIG. 1 is a side elevation in cross-section of the embodiment.
Figure 2:
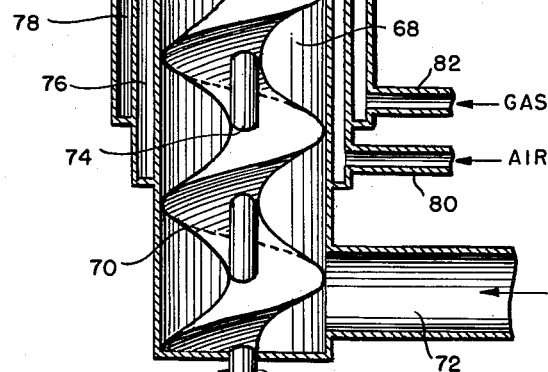
FIG. 2 is a plan view of the burner taken on section 3—3 of FIG. 1.
Figure 2:
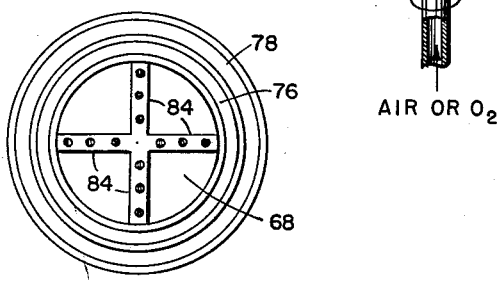

The burner comprises a reaction or combustion chamber 60 having a gas and vapor exit 62 and a solids and/or liquids exit 64. The reaction chamber 60 is provided with a baffle 66 forming a combustion pot surrounding the fuel feed opening therein. The combustible mixture is fed into the reaction chamber through a conduit 68 by a rotating screw or worm 70. The fuel or feed stock is fed into the worm through conduit 72. The rotating shaft 74 of the worm is hollow and is connected to a source of air or oxygen or other gas. Annular conduits 76 and 78 are provided around the upper end of the conduit 68 and open into the reaction chamber 60. The annular conduit 76 has a conduit 80 connected to a source of air, and the annular conduit 78 is connected to a source of combustible gas through conduit 82 in the case of a burner. Hollow, perforated, rotating, arms 84 are affixed to the rotating shaft at the upper end of the conduit 68.

The feed stocks, e.g., combustible solids or a slurry of combustible solids in a liquid, are carried by the rotating worm to the combustion zone. The rotation of the arms 84 keeps the incoming feed stocks stirred up and prevents caking and clogging. In the case of a burner, combustion is supported by air or oxygen exiting from the perforations in the rotating arms 84 and by the burning of the combustible gas and air as they exit from the annular conduits 76, 78. Operating circumstances determine whether hollow shaft 74 and annular conduits 76 and 78 conduct oxidants or combustibles. It is not fixed that each must conduct material as here stated. Nongaseous products are forced over the wall of the baffle 66 and are removed from the reaction chamber 60 through one or more exits 64. The gases and vapors and entrained solids, if any, are removed from the reaction through exit 62 and then conducted to a cyclone separator. The gases, vapors and nongaseous products issuing from exits 62 and 64 are then utilized for heating purposes by passing them in direct contact through a substance to be heated, e.g., sulfur, water, etc., or by passing them through indirect heat exchange apparatus.

Also, when circumstances warrant, a hydrogen oxygen flame is generated by using passages 74, 80 and 82. This flame forms water. Water at high temperatures splits off oxygen to leave the hydrogen to combine with other elements and molecules. This leaves the hydrogen available for further reacting or other uses. Additional instances occur when passages 74, 80 and 82 are used for conducting oxidants such as the halogens and other fuels usch as $H_2S$. In case chlorine-containing compounds are to be formed in reaction chamber 60, chlorine and $H_2S$ are used to generate the flame. The resulting heat, HCl and sulfur cause reactions that alter the feed stocks coming in through conduit 68. These unique reaction compounds are the basic chemicals in which have been formed various anhydrides, phthalates, carboxylic acids and numerous other hydrocarbon oxidation compounds. These basic chemical mixtures are the sources of chemical intermediates so highly prized in chemical manufacturing processes.

The invention is hereby claimed as follows:

1. Apparatus for conducting combustion-type chemical reactions with solid and fluid feed stocks comprising walls forming a reaction chamber, said walls including a horizontal, bottom wall; a vertical conduit communicating with said reaction chamber through said bottom wall, the upper end of said conduit being substantially flush with said bottom wall; a screw conveyor rotatably mounted in said vertical conduit for conveying a solid chemical reactant to said reaction chamber, the upper end of said screw conveyor being substantially flush with said bottom wall and said upper end of said conduit; the drive shaft of said screw conveyor being a hollow shaft, the upper end of which is substantially flush with said bottom wall and said upper end of said conduit; hollow, radially extending arms mounted on and communicating with said upper end of said hollow shaft, said arms being rotatable along with said hollow shaft in a plane of rotation of said arms substantially in the plane of said bottom wall; each of said hollow arms having spaced therealong a plurality of small, upwardly-directed gas ports; a vertical baffle wall mounted on the bottom wall of said reaction chamber and extending upwardly therefrom in surrounding relationship to said upper end of said conduit, said baffle wall forming with the portions of the bottom wall inside said baffle wall a combustion pot in said reaction chamber; a second, vertical conduit mounted about said first-mentioned conduit and spaced therefrom to form a vertical annular passage therebetween for conveying a fluid chemical reactant to said reaction chamber, said passage opening into said reaction chamber through said bottom wall and inside said baffle wall; a third conduit mounted in surrounding relationship about said second conduit and spaced therefrom to form a second, annular, vertical passage therebetween for conveying a fluid chemical reactant to said reaction chamber, said second passage opening into said reaction chamber through said bottom wall and inside said baffle wall; and the upper ends of said second and third conduits being substantially flush with said bottom wall of said reaction chamber.

2. Apparatus as claimed in claim 1 wherein there is a conduit communicating with the lower portion of said reaction chamber outside said baffle wall and below the plane of the upper edge of said baffle wall for removing from said reaction chamber nongaseous products of chemical reaction which spill over the upper edge of said bafflle wall.

References Cited in the file of this patent

UNITED STATES PATENTS

| | | |
|---|---|---|
| 1,139,708 | Neidergesaess | May 18, 1915 |
| 1,675,548 | Hall | July 3, 1928 |
| 1,865,983 | Warner | July 5, 1932 |
| 2,046,767 | Campbell | July 7, 1936 |
| 2,176,009 | Lange | Oct. 10, 1939 |
| 2,242,580 | Foulds | May 20, 1941 |
| 2,396,888 | Scholl | Mar. 19, 1946 |
| 2,422,653 | Breese et al. | June 24, 1947 |
| 2,455,817 | Sherman | Dec. 7, 1948 |
| 2,925,319 | Groll | Feb. 16, 1960 |